US007711840B2

(12) United States Patent
David et al.

(10) Patent No.: US 7,711,840 B2
(45) Date of Patent: May 4, 2010

(54) PROTOCOL FOR REMOTE VISUAL COMPOSITION

(75) Inventors: Paul C. David, Kirkland, WA (US); Oreste Dorin Ungureanu, Duvall, WA (US); Gregory D. Swedberg, Bellevue, WA (US); Donald B. Curtis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1895 days.

(21) Appl. No.: 10/692,371

(22) Filed: Oct. 23, 2003

(65) Prior Publication Data

US 2005/0102321 A1 May 12, 2005

(51) Int. Cl.
G06F 15/16 (2006.01)
G06F 3/048 (2006.01)

(52) U.S. Cl. ..................... 709/231; 715/861
(58) Field of Classification Search ............. 709/203, 709/217–219, 238, 245–246, 226, 201–205, 709/227–232; 707/10, 4, 104.1; 715/206, 715/844, 861
See application file for complete search history.

(56) References Cited

U.S. PATENT DOCUMENTS

| 5,822,562 | A | * | 10/1998 | Dahlen et al. ............... 711/170 |
| 6,286,003 | B1 | * | 9/2001 | Muta ........................... 707/10 |
| 6,754,215 | B1 | | 6/2004 | Arikawa et al. |
| 7,043,697 | B1 | * | 5/2006 | Jensen et al. ................. 715/788 |
| 7,088,374 | B2 | * | 8/2006 | David et al. .................. 345/619 |
| 7,199,836 | B1 | * | 4/2007 | Eleftheriadis et al. ........ 348/578 |
| 2002/0198987 | A1 | * | 12/2002 | Fukazawa et al. ........... 709/224 |
| 2003/0110211 | A1 | | 6/2003 | Donon |
| 2003/0177172 | A1 | * | 9/2003 | Duursma et al. ............ 709/203 |
| 2005/0022131 | A1 | * | 1/2005 | Saint-Hilaire et al. ....... 715/740 |

OTHER PUBLICATIONS

Australian Examiner's First Report dated November 26, 2008 cited in Application No. 2004279201.

* cited by examiner

Primary Examiner—Bunjob Jaroenchonwanit
Assistant Examiner—Yasin Barqadle
(74) Attorney, Agent, or Firm—Merchant & Gould

(57) ABSTRACT

A method and protocol to create and control compositions on a remote device is disclosed. The protocol allows servers and other devices to take advantage of processing capabilities of remote devices to render compositions on the remote devices, thereby increasing server scalability and leveraging the remote device processing capabilities. The protocol provides high-level command packets to communicate resource command packets and control packets to the remote device with the payload having the information needed to process the commands.

18 Claims, 9 Drawing Sheets

PROTOCOL FOR REMOTE VISUAL COMPOSITION

FIELD OF THE INVENTION

This invention relates generally to electronic data processing and, more particularly, relates to managing the flow of graphics and control information in a computer system.

BACKGROUND OF THE INVENTION

Digitally based multimedia, the combination of video and audio in a digital format for viewing on a digital device, and digital media such as images and animation is rapidly increasing in capacity and proliferation. Nearly every new personal computer manufactured today includes some form of multimedia. Sales of digital products such as cameras, video recorders, phones and televisions are steadily increasing. Multimedia is also becoming increasingly prevalent in the Internet realm as the growth of the Internet steadily and rapidly continues. Continued advances in these computer-based technologies have lead to not only increased performance, but also increased performance expectations by the users of such computer equipment. The industry has responded with increased speed for CD ROM drives, communication modems, and faster video and audio cards. These increased user expectations extend not only to hardware capability, but also to the processing capability of data.

For example, in areas such as multimedia and audio compression, data is processed so that it can be processed as a steady and continuous stream. This data is used in areas such as video conferencing, gaming, digital video discs (DVD), professional audio, telephony, and other areas where audio, video, or audio and video is digitally processed.

Rendering data almost always requires some form of processing among various modules in a system. For example, a video clip might require decoding in a dedicated hardware module, rasterizing the video fields in another hardware module, digital filtering of the audio in a software module, insertion of subtitles by another software module, parsing audio data to skip silent periods by a software module, etc. For streaming to work, the data must be processed as a steady stream and then rendered to audio and/or video. If the data isn't processed quickly enough, however, the presentation of the data will not be smooth.

In conventional client-server rendering, the data is processed at the server and sent in discrete virtual frames to the client where the frames are rendered. Each frame contains the entire data and information needed to render the frame, even if there is no change in the item being rendered. For example, every animation frame has the full amount of data and information to render the frame even if the frame is identical to an adjacent frame. As a result, the transmission of the data consumes a large amount of available bandwidth. This bandwidth consumption reduces the number of clients a server can support. Additionally, hardware on a client machine cannot be taken advantage of to process the data. For example, the server in processing the data does not have the ability to use the hardware features of client hardware such as 3D graphic accelerators.

BRIEF SUMMARY OF THE INVENTION

The invention provides a method and protocol to create and control compositions on a remote device. The protocol allows servers and other devices to take advantage of processing capabilities of remote devices to compose visual content on the remote display devices. This allows servers to handle more clients because the server does not need to process the functions (e.g., paint, draw, animate, etc.) used to actually render the composition. This results in the ability to leverage more of the client side hardware capabilities such as a client's 3D hardware acceleration pipe, and the client CPU. For example, the client can process animation functions, which allows the server to send information that describes the animation function instead of sending the individual static frames comprising the overall animate effect to the client.

The protocol provides basic high-level command packets that allow applications to communicate commands across a medium to create a composition on a client device. The payload of the packets may contain the actual commands for the components on the device to create the composition. The requesting application sends packets of commands to create a composition service, create a render target and render context, create a composition node, create resources for the composition node, and render the composition.

The packets from the requesting application are resource command packets and control packets. The resource command packets are routed to the relevant resources on the client. The control packets are used to control the composition state and to maintain a text glyph cache on the client machine. Notification packets are sent back to the requesting application.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
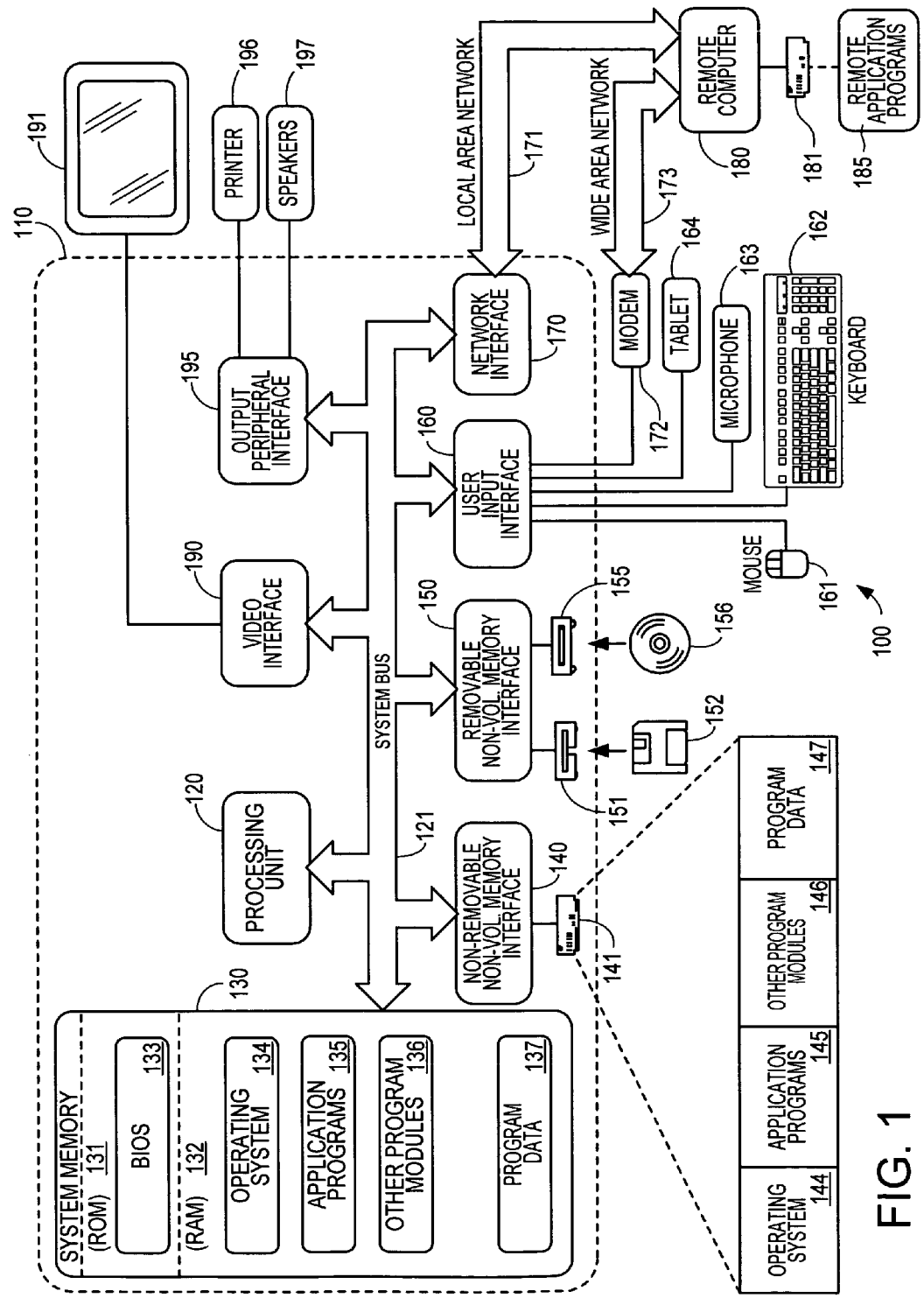
FIG. 1 is a block diagram generally illustrating an exemplary computer system on which the present invention resides.

The present invention provides the ability for a server to offload aspects of composition processing to client machines. This results in an increase in server side scalability. The high-level descriptive nature of the communication protocol results in a significantly smaller amount of data and information being sent to a client for rendering data than would be the case when sending data with an immediate-mode model.

Prior to describing the details of the invention, an overview of the exemplary device in which the invention may be implemented and the environment in which the invention may operate will be described. Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It should be noted that a programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
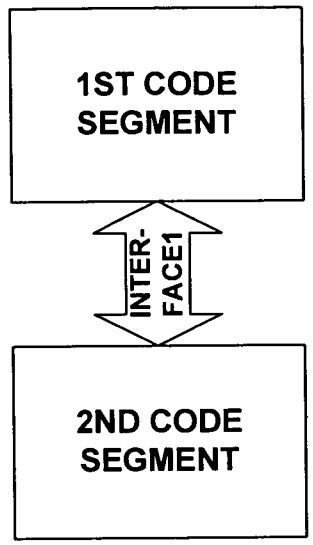
FIG. 2a is a simplified block diagram illustrating a programming interface between two code segments.
Figure 2B:
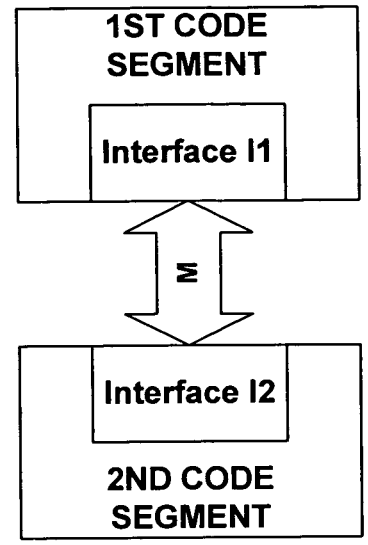
FIG. 2b is a simplified block diagram illustrating an alternate embodiment of a programming interface between two code segments.

Notionally, a programming interface may be viewed generically, as shown in FIG. 2a or 2b. FIG. 2a illustrates an interface Interface1 as a conduit through which first and second code segments communicate. FIG. 2b illustrates an interface as comprising interface objects I1 and I2 (which may or may not be part of the first and second code segments), which enable first and second code segments of a system to communicate via medium M. In the view of FIG. 2b, one may consider interface objects I1 and I2 as separate interfaces of the same system and one may also consider that objects I1 and I2 plus medium M comprise the interface. Although FIGS. 2a and 2b show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 2a and 2b, but they nonetheless perform a similar function to accomplish the same overall result. We will now briefly describe some illustrative alternative implementations of a programming interface.

A. Factoring

Figure 3A:
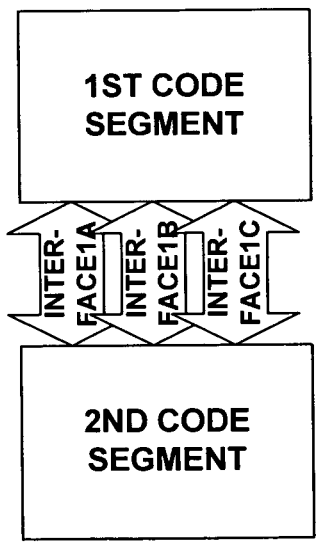
FIG. 3a is a simplified block diagram illustrating a programming interface between two code segments having communications that are broken into multiple discrete communications, illustrating the concept of factoring.
Figure 3B:
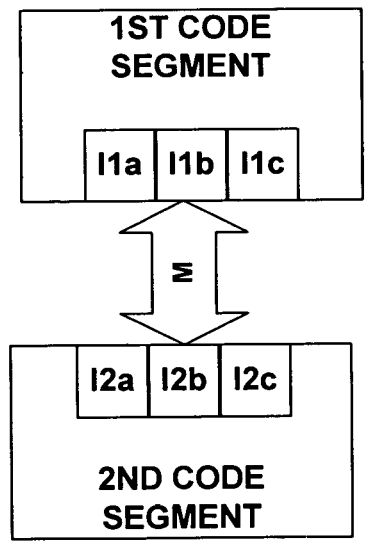
FIG. 3b is a simplified block diagram illustrating an alternate embodiment of a programming interface between two code segments having communications that are broken into multiple discrete communications, illustrating the concept of factoring.

A communication from one code segment to another may be accomplished indirectly by breaking the communication into multiple discrete communications. This is depicted schematically in FIGS. 3a and 3b. As shown, some interfaces can be described in terms of divisible sets of functionality. Thus, the interface functionality of FIGS. 2a and 2b may be factored to achieve the same result, just as one may mathematically provide 24, or 2 times 2 times 3 times 2. Accordingly, as illustrated in FIG. 3a, the function provided by interface Interface1 may be subdivided to convert the communications of the interface into multiple interfaces Interface1A, Interface 1B, Interface 1C, etc. while achieving the same result. As illustrated in FIG. 3b, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 3a and 3b, the functional spirit of interfaces Interface1 and I1 remain the same as with FIGS. 2a and 2b, respectively. The factoring of interfaces may also follow associative, commutative, and other mathematical properties such that the factoring may be difficult to recognize. For instance, ordering of operations may be unimportant in some applications, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 4A:
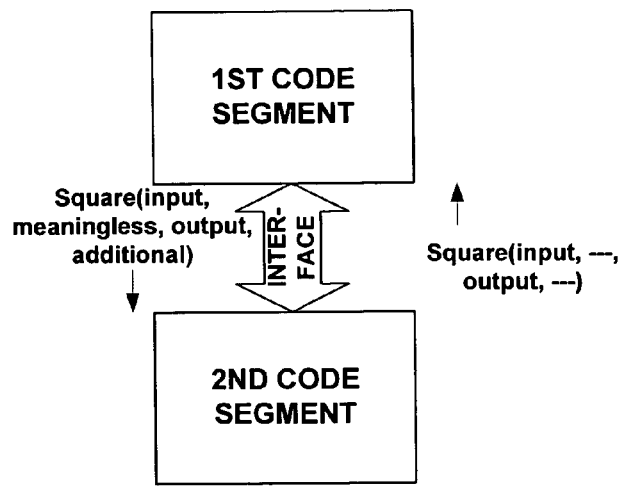
FIG. 4a is a simplified block diagram illustrating a programming interface between two code segments having certain aspects ignored, added, or redefined, illustrating the concept of redefinition.
Figure 4B:
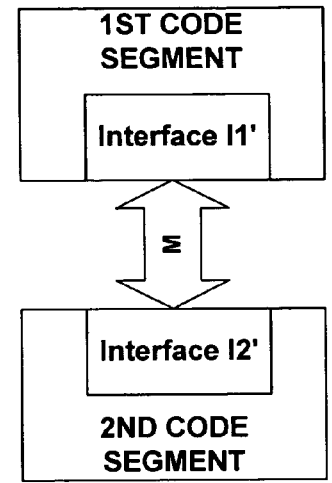
FIG. 4b is a simplified block diagram illustrating an alternate embodiment of a programming interface between two code segments having certain aspects ignored, added, or redefined, illustrating the concept of redefinition.

In some cases, it may be possible to ignore, add or redefine certain aspects (e.g., parameters) of a programming interface while still accomplishing the intended result. This is illustrated in FIGS. 4a and 4b. For example, assume interface Interface1 of FIG. 2a includes a function call Square (input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 4a, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4b, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 5A:
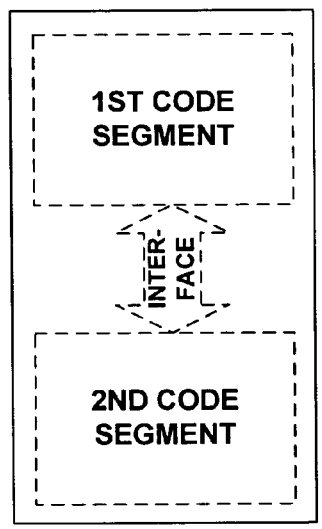
FIG. 5a is a simplified block diagram illustrating a programming interface between two code segments having some of the functionality of the two code modules merged such that the interface between them changes form, illustrating the concept of inline coding.
Figure 5B:
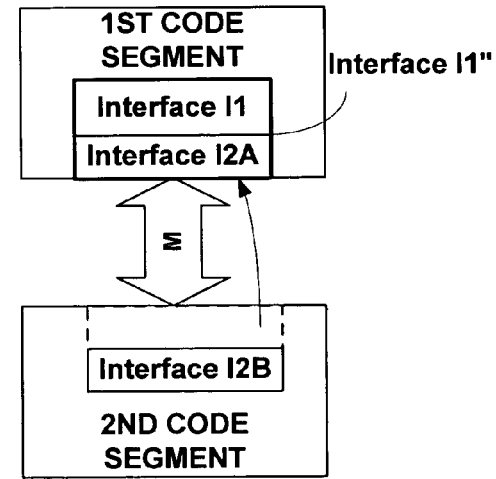
FIG. 5b is a simplified block diagram illustrating an alternate embodiment of a programming interface between two code segments having some of the functionality of the two code modules merged such that the interface between them changes form, illustrating the concept of inline coding.

It may also be feasible to merge some or all of the functionality of two separate code modules such that the "interface" between them changes form. For example, the functionality of FIGS. 2a and 2b may be converted to the functionality of FIGS. 5a and 5b, respectively. In FIG. 5a, the previous $1^{st}$ and $2^{nd}$ Code Segments of FIG. 2a are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 5b, part (or all) of interface I2 from FIG. 2b may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 2b performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 6A:
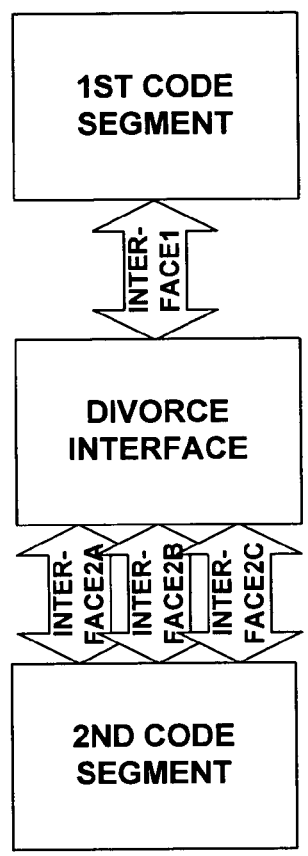
FIG. 6a is a simplified block diagram illustrating a programming interface between two code modules wherein the communication is accomplished indirectly by breaking the communication into multiple discrete communications, illustrating the concept of divorcing.
Figure 6B:
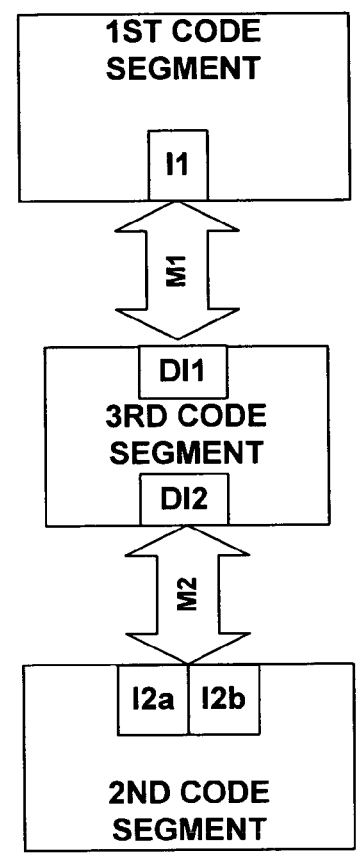
FIG. 6b is a simplified block diagram illustrating an alternate embodiment of a programming interface between two code modules wherein the communication is accomplished indirectly by breaking the communication into multiple discrete communications, illustrating the concept of divorcing.

A communication from one code segment to another may be accomplished indirectly by breaking the communication into multiple discrete communications. This is depicted schematically in FIGS. 6a and 6b. As shown in FIG. 6a, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 6b, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 2b to a new operating system, while providing the same or similar functional result.

E. Rewriting

Figure 7A:
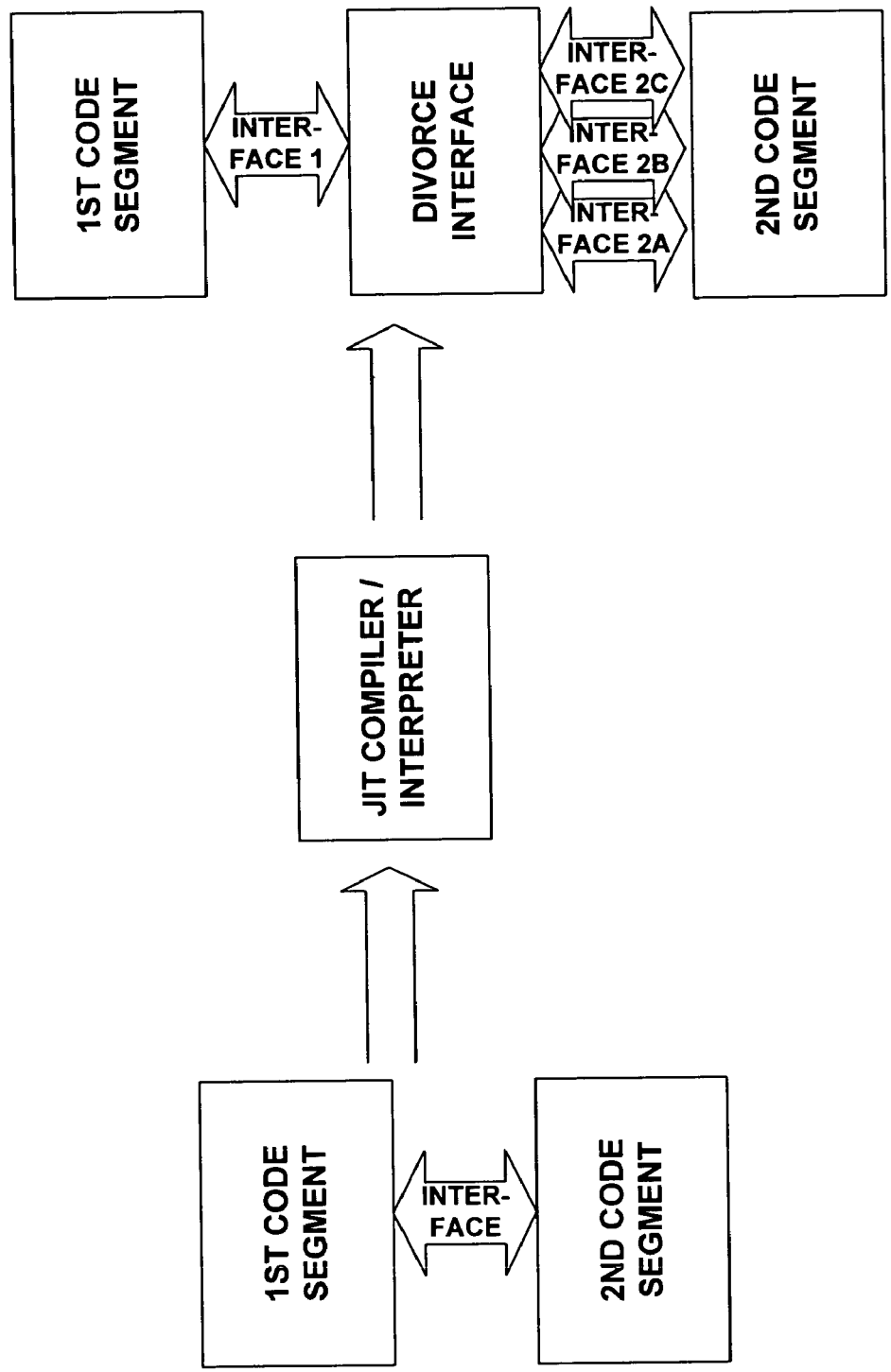
FIG. 7a is a simplified block diagram illustrating dynamically rewritten code to replace a programming interface with something else that achieves the same result, illustrating the concept of rewriting.
Figure 7B:
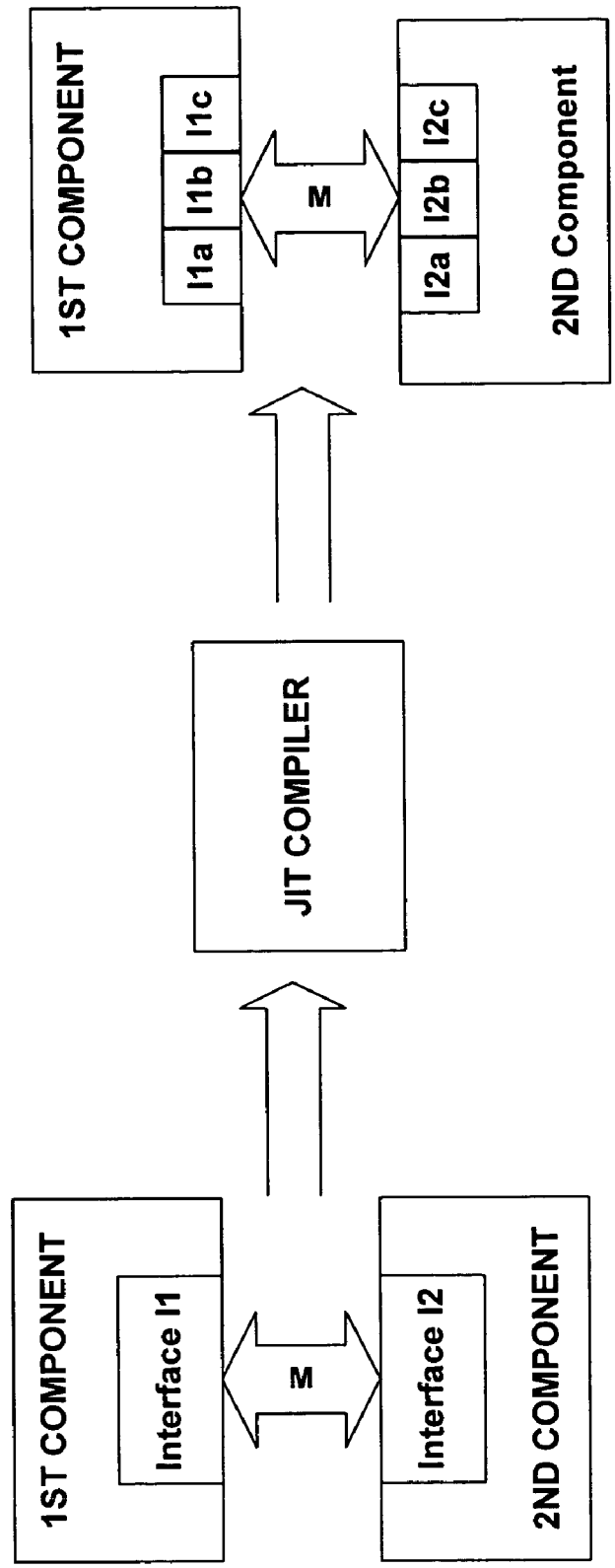
FIG. 7b is a simplified block diagram illustrating an alternate embodiment of dynamically rewritten code to replace a programming interface with something else that achieves the same result, illustrating the concept of rewriting.

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7a and 7b. As can be seen in FIG. 7a, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 7b, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2a and 2b. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 8:
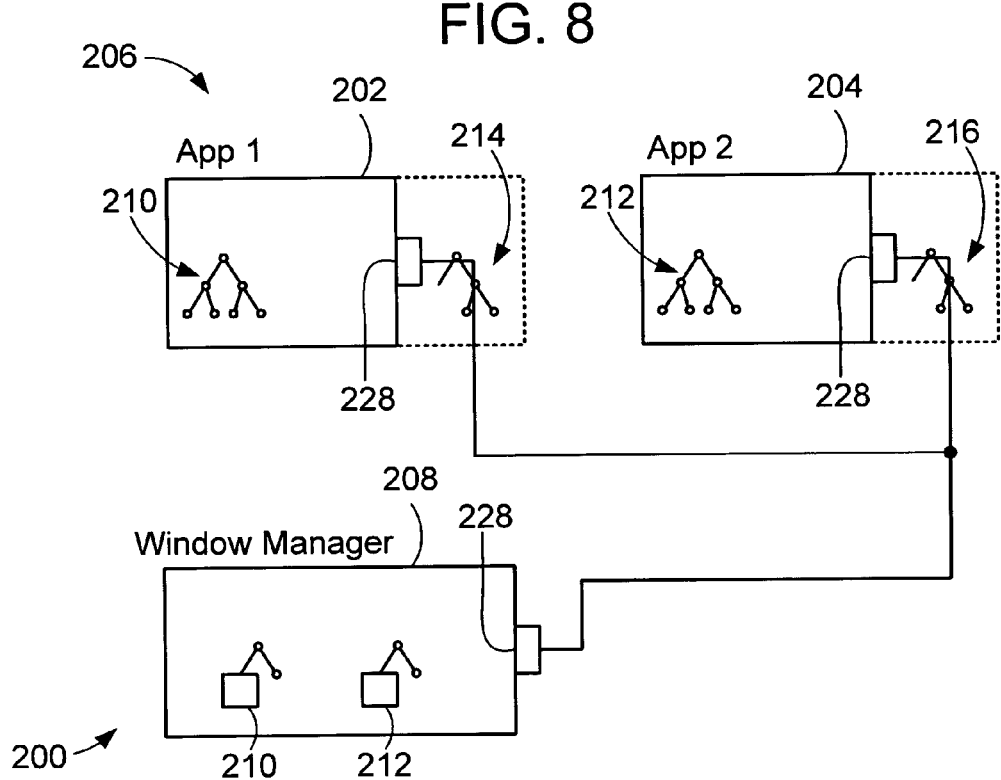
FIG. 8 is block diagram generally illustrating an exemplary environment in which the present invention operates.

Turning now to FIG. 8, an exemplary environment 200 in which the invention operates. Applications 202, 204 reside on server 206. Window manager 208 allows one to work with and organize windows and performs operations such as moving windows, resizing windows, destroying windows, decorating windows with titlebars and other items which make the above operations easier, and the like. Applications 202, 204 create visual trees 210, 212 to indicate how an item (e.g., text document, graphic, animation. etc.) is being displayed by the application. A visual tree represents a data structure that is rendered by a graphics system to a medium (e.g., display monitor, printer, surface, etc.). When a visual tree is rendered, the data in the visual tree is the "scene" the user sees in the application area of the display when the application is being used. The applications 202, 204 retain control of their respective visual tree to control what is happening on the application display area on the display device (e.g., monitor 191). The applications 202, 204 submit their visual tree output to an in process composition loop via interface 228. This output is used to build a sub tree of the application's visual tree. The sub tree is composed to a surface, which in turn is submitted to the window manager 208 for desktop composition. The window manager 208 then assesses what will and will not be displayed based on the visibility of the application in the display and a composition tree 214, 216 is created based on the assessment. The composition tree is rendered independently of a visual tree. The composition tree includes all elements compiled from a visual tree that a user would see on the display device. For example, if the visual tree were created for a document, the composition tree would be that portion of the document that is being displayed.

The present invention allows the composition trees to be remotely created and operated without having to create the composition tree at the server. While the invention will be described in terms or remotely creating and operating a composition tree, it is recognized that the invention may be used to create and render compositions on the server of FIG. 8.

Figure 9:
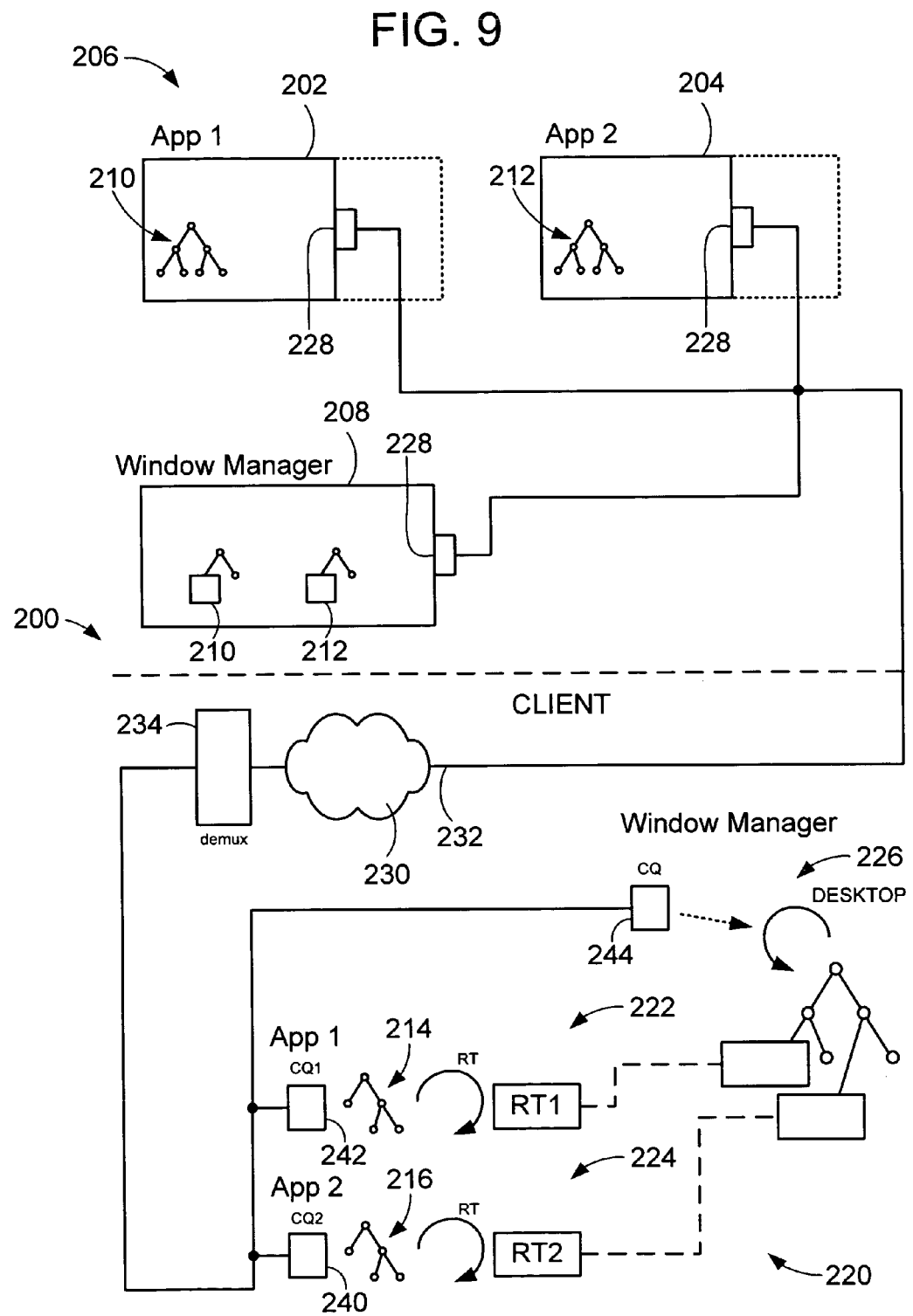
FIG. 9 is a block diagram generally illustrating an alternate exemplary environment in which the present invention operates.

Turning now to FIG. 9, the applications 202, 204 on server 206 are being displayed on client device 220. While only one client device is shown, it is recognized that any number of client devices may be used. The applications 202, 204 and window manager 208 use interface 228 to communicate with respective composition modules 222-226 226 over the network 230 via communication channel 232 using packets. The number of composition modules that may be used in conjunction with a single application domain may be any number as desired. Note that the server 206 and client 220 need not be connected by a network or any other means, but instead, data may be migrated via any media capable of being written by the server platform and read by the client platform or platforms. In one embodiment, the packets are encapsulated with a remote data protocol to send the information to create the composition trees 214, 216 to the client 220. An identifier is placed in each packet to identify which composition module 222-226 is the destination of the packet. Component 234 demultiplexes packets and sends the packets to the appropriate change queue 240, 242, 244 of modules 222-226.

The device independent protocol of the instant invention provides the applications and clients to interface with the server via the communication channel 232 to compose content. The types of content include resource command packets and control packets. Resource types include pens, brushes, bitmaps, glyphs, video clips, geometries (ellipses, rectangles, boxes, circles, etc.), animations, memory, etc. Composition nodes are the fundamental unit of spatial containment available to client applications. Clients create composition nodes on their composition service. A composition node may contain one or more resources. There is always one root composition node, representing the screen content or desktop. There may be one or more composition nodes representing off-screen composition.

In the description that follows, the device independent protocol will be described through typical call sequences. The communication is asynchronous. Specific connect, reconnect, and disconnect semantics are used. The applications 202, 204, 208 communicate with the respective composition module 222, 224 resident in the client 220. A single connection is usually initiated and maintained for the lifetime of the application because connecting and disconnecting a connection are expensive operations and communication to the composition module on the client is likely to be frequent. The cost of maintaining the connection will be much lower than the cost of repeatedly disconnecting and connecting. The communication between the server applications 202, 204, 208 and the composition modules 222-226 is in the form of packets.

The server applications 202, 204, 208 connect to the client 220 and start sending packets. Packets can be resource packets, control packets, and batch packets. Resource packets are used to create resources and to update resources. Control packets are used to control the composition state and to maintain a text glyph bitmap cache on the client machine 220. Batch packets are used to apply multiple changes atomically. A create batch command is sent to the client 220 to indicate the beginning of a batch. The composition modules accrue the requests until the batch is "ended." The batch is ended by sending a batch close/commit packet. At that point, the composition service begins processing the commands. The change queue inside of the composition service retains the batching construct so as to ensure that the changes occur atomically.

Figure 10:
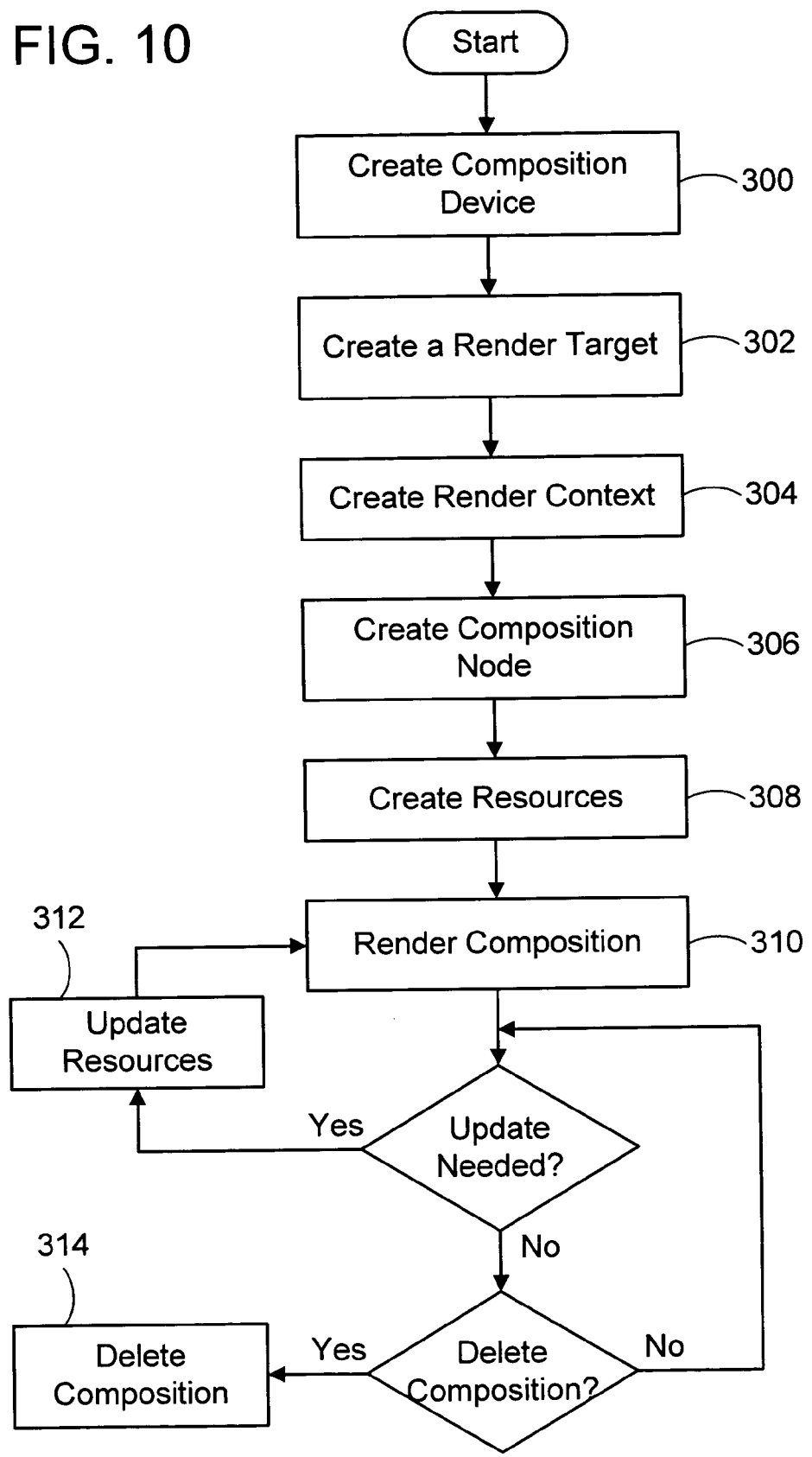
FIG. 10 is a flow chart illustrating the steps to create a composition in accordance with the teachings of the present invention.

Turning now to FIG. 10, the steps to create and control a composition are shown. Server application 202 will be used to describe the steps. Those skilled in the art recognize that any segment(s) of code may be used. A composition module is created (step 300). The composition module is responsible for rendering the composition for the connection that has been created. A render target is created that generates a resource command to create a rendertarget resource (step 302) and render context that is associated with the rendertarget resource is created (step 304). The render target is the destination target for rendering resources. A composition node is created (step 306). Resources are then created (step 308) and the composition is rendered (step 310).

Composition utilizes the combination of simple and compound resources in order to render the content to the target. A simple resource is self-contained, and has no direct dependency on any other resource. A compound resource references other dependent resources. One example of a compound resource is the "rendering data" resource. The "rendering data" resource is comprised of retained list of rendering instructions which may in turn reference other resources, such as brushes, pens, or descriptions of geometry. The rendering data resource is used to encode rendering operations performed with the help of other resources. Render data resources are associated with composition nodes, which have the role of spatially localizing these rendering operations.

When a composition needs to be updated, an update command is sent (step 312). The update could be adding resources or updating resources. A particular composition may need to be deleted and a new composition created. For example, if the composition is a text document, the composition is deleted if the text document is closed. If the composition is to be deleted, a destruction command is sent to the composition service (step 314).

Animation may be pervasive throughout a platform. The invention delivers scalable animation in one embodiment by allowing clients to assume complete responsibility for evaluating and presenting the animation. This is sufficient in many cases, especially when the animation is complex or when the animation target requires that a non-accelerated set of operations (such as tessellation) occur. For certain low-cost, high visibility user interface effects such as motion animation, it makes sense to allow these operations to occur during a chain's composition pass. In such a case, the application 202 would sample the high-level animation function and provide a series of timestamped values associated with a resource as a request to the composition service. These represent the intervals over which the resource is to be animated, and the endpoints of the timeline during which the interval remains active. The application 202 sends an update resource packet to update a resource value. Note that the sequence belies the underlying complexity. The composition module normalizes the timestamped values to the composition service's global timeline, and a composition manager (not shown) will plug the update block into the appropriate resources during composition to the render target. For each composited frame, the composition module will evaluate the resource's interval to derive the instantaneous value.

Now that the overall structure of the programming interface has been described, the resource and control command packets will be described. The control packets are used to control the composition state and to maintain a text glyph cache used by the composition module on the client 220.

The control packets are Resource_Command_Null, Resource_Command_Release, Resource_Command_Shutdown, Resource_Command_Synchronize, Resource_Command_Status, Resource_Command_Add_Glyph_Bitmaps, Resource_Command_Free_Glyph_Bitmaps, and Resource_Command_Flush_Queue. The Resource_Command_Release releases a resource. The Resource_Command- _Shutdown shutdowns the composition module and deletes everything associated with the composition module. The Resource_Command_Synchronize command deletes everything associated with the composition node to start fresh. The Resource_Command_Status sends a status message to the composition module. The Resource_Command_Add_Glyph_Bitmaps adds bitmaps to the glyph cache. The Resource_Command_Free_Glyph_Bitmaps removes bitmaps from the glyph cache. The Resource_Command_Flush_Queue flushes the change queue.

A notification queue that transports notification packets from the client 220 back to the server 206 is maintained. These can be of the following type: Notification_Resource_Deleted, Notification_Shutdown, Notification_Synchronize, Notification_Status, and Notification_Error.

The resource command packets are used to render resources. A resource may be defined as "any object needed for rendering a scene that requires different realizations for different resolutions and/or physical devices; that is used multiple times within a composition tree; or that may change independently of its users such as via animation.". Resources are able to serialize themselves, apply updates, and provide a realization for a particular resolution and device. The resource types include Null, Memory, Renderdata, Bitmap, Glyphrun, Vertices, Timeline, Doubleanimation, Coloranimation, Pointanimation, Rectanimation, Sizeanimation, Doubleanimationcollection, Coloranimationcollection, Pointanimationcollection, Rectanimationcollection, Sizeanimationcollection, Transform, Double, Color, Point, Rect, Size, Gradient, Brush, Figure, Geometry, Pen, Video, Composition_Node, Composition_Context, Image, Hwnd_Composition_Target, and Intermediate_Composition_Target. The Hwnd_Composition_Target is used to render to a window. The intermediate composition target may be used for off screen rendering.

Resources sent to a composition module are generally directly realizable by the composition module without callback. If not directly realizable, the required.

A notification queue that transports notification packets from the client 220 back to the server 206 is maintained. These can be of the following type: Notification_Resource_Deleted, Notification_Shutdown, Notification_Synchronize, Notification_Status, and Notification_Error.

The resource command packets are used to render resources. A resource may be defined as "any object needed for rendering a scene that requires different realizations for different resolutions and/or physical devices; that is used multiple times within a composition tree; or that may change independently of its users such as via animation." Resources are able to serialize themselves, apply updates, and provide a realization for a particular resolution and device. Resources are able to serialize themselves, apply updates, and provide a realization for a particular resolution and device. The resource types include Null, Memory, Renderdata, Bitmap, Glyphrun, Vertices, Timeline, Doubleanimation, Coloranimation, Pointanimation, Rectanimation, Sizeanimation, Doubleanimationcollection, Coloranimationcollection, Pointanimationcollection, Rectanimationcollection, Sizeanimationcollection, Transform, Double, Color, Point, Rect, Size, Gradient, Brush, Figure, Geometry, Pen, Video, Composition_Node, Composition_Context, Image, Hwnd_Composition_Target, and Intermediate_Composition_Target. The Hwnd_Composition_Target is used to render to a window. The intermediate composition target may be used for off screen rendering.

Resources sent to a composition module are generally directly realizable by the composition module without callback. If not directly realizable, the required realization is sent. Resources like "Text" and "Images" are expensive (in terms of processing overhead) to realize and are therefore converted to the appropriate "ready-to-render" form for use in the composition tree. Converting the resources to a form that may be readily rendered conserves overhead for composition in the composition module. Resources are also converted to the appropriate "ready-to-render" form if they require any callbacks to user code. Other resources like "Geometry" that may be tessellated efficiently by the composition module to the correct resolution when needed are realized by the composition module itself.

Resources are generally separated into a few types, such as drawing resources, value resources, and structural resources. Drawing resources are objects defined by the rendering layer and may be consumed directly by that layer. Examples of drawing resources include RenderData, Bitmap, Image, Glyphrun, Geometry, and Brush.

Drawing resources with very low and constant rendering cost can be realized during composition directly from the device and resolution independent source data. Geometry is a simple drawing resource because it can be tessellated to the final required resolution efficiently in the composition loop of the composition module. In contrast, complex drawing resources require complex computations, call backs to user code, or input/output to generate realizations. In one embodiment, complex drawing resources are not realized by the composition module. Instead, the appropriate realizations are provided by the applications 2022, 204 and/or server 206 in advance to composition. "Image" is an example of a complex resource. Images are read from disk, decoded, sampled at the appropriate resolution and filtered.

Value resources represent a simple changeable or animate value used by another resource. Examples of value resources are Double, Point, Color, and Transform. For example, a RenderData resource may refer to a Point resource to draw a line where one of the points is expected to change via animation or imperative direction by the application. Value resources may be static or animate. If the value resource is animate, the value resource contains animation interval data defining how the value changes with time.

Structure resources are objects that play a role in the composition process but are not directly part of rendering. These objects are implemented as resources so that they may participate in updates via the change queue and use Value Resources to update internal values. Identified structure resources include Composition Node.

In general, resources must be realized before they can be used. A realization may be referred to as "a representation of a resource that is appropriate for a given resolution and is ready for use by a specific device." An example of a realization is a geometry tessellated into triangles for a particular resolution and transformation and potentially already loaded into a vertex buffer on the video card. Realizations are either created on demand in the composition module or are created at the server 206 and sent to the composition module. If a resource realization that is required cannot be found or created a notification is queued via the notification queue to the server 206. The notification indicates the resource handle, the transform, and the device needed, along with any transform of the realization used.

Packets have a structure as shown below

```
{
    MIL_PACKET_TYPE packetType;
    HMIL_RESOURCE resHandle;
    MIL_RESOURCE_TYPE type;
    DWORD size;
    int marshalType;
}
``` where the Mil_Packet_Type is one of a batch packet, a control packet, or a resource packet. The HMIL_Resource handle must be of the proper type for the resource. These handles must be for a resource, context, or a composition node (e.g., a compnode). The MIL_Resource_Type is the type of resource as indicate above (e.g., bitmap, transform, geometry, etc.)

Appended to the packet are commands that are used to instruct the composition service to perform tasks. This allows third party vendors to supply their own code to operate their composition services. One such implementation is below.

```
//HRESULT CMilResourceBrushSolidColorData::MarshalDataCore
struct BrushSolidColorPacket
{
    MIL_COLORF colr;
    HMIL_RESOURCE hColor;
}
/*
HRESULT
CMilResourceBrushSolidColorData::MarshalDataCore(IMilTransportEncoder*
pEncoder)
{
    HRESULT hr = S_OK;
    Assert(NULL != pEncoder);
    // Call base method before our own
    CMilResourceBrushData::MarshalDataCore(pEncoder);
    pEncoder->AddColor(&(m_brushSolidData.color));
    pEncoder->AddResource(m_brushSolidData.hColor);
Cleanup:
    RRETURN(hr);
}
*/
//HRESULT CMilResourceBrushLinearGradient::Marshal
struct BrushLinearGradientPacket : Packet
{
    int brushtype = MilUceBrushTypeLinearGradient;
    float Alpha;
    HMIL_RESOURCE hAlpha;
    HMIL_RESOURCE hTransform;
    float beginPointx;
    float beginPointy;
    HMIL_RESOURCE hBeginPoint;
    float endPointx;
    float endPointy;
    HMIL_RESOURCE hEndPoint;
    int wrapMode;
    HMIL_RESOURCE hGradient;
    int bGammaCorrect;
    int bAdjustToObject;
}
//CMilResourceBrushData::MarshalData
struct BrushDataPacket : Packet
{
    int brushtype;
    double dblOpacity;
    HMIL_RESOURCE hOpacity;
    HMIL_RESOURCE hTransform;
}
//CMilResourceBrushRadialGradient::Marshal
struct BrushRadialGradientMarshalPacket : Packet
{
    UINT brushtype = MilUceBrushTypeRadialGradient;
    float alpha;
    HMIL_RESOURCE hAlpha;
    HMIL_RESOURCE hTransform;
    float centerPointX;
    float centerPointY;
    HMIL_RESOURCE hCenter;
    float radPointX;
    float radPointY;
    HMIL_RESOURCE hRadius;
    float focPointX;
    float focPointY;
    HMIL_RESOURCE hFocus;
    int wrapMode;
```

-continued

```
        HMIL_RESOURCE hGradient;
        int bGammaCorrect;
        int bAdjustToObject;
}
//CMilResourceGradient::Marshal
struct GradientMarshalPacket : Packet
{
        UINT stopCount;
        //stops bytes here:
        //hr = pEncoder->AddMemory(m_data.m_rgGradientStops,
nDataByteCount);
}
//CMilResourceBrushNineGrid::Marshal
struct BrushNineGridMarshalPacket : Packet
{
        int brushType = MilUceBrushTypeNineGrid;
        double rOpacity;
        HMIL_RESOURCE hOpacity;
        HMIL_RESOURCE hTransform;
        HMIL_RESOURCE hImageData;
        HMIL_RESOURCE hGlyphImageData;
        UINT iLeftBorder;
        UINT iTopBorder;
        UINT iRightBorder;
        UINT iBottomBorder;
}
//TMilMasterAnimatedValue<TValue, ResType, AnimResType,
CollResType>::Marshal (
struct MasterAnimatedValuePacket : Packet
{
        int animtype = MilAnimatedValueMarshal;
        int marshalType = MilAnimatedValueMarshalAux;
        HMIL_RESOURCE hAnimationCollection;
        int offsetToValue;
        int sizeOfValue = sizeof(TValue);
        int offsetToBaseValue;
        int sizeOfBaseValue = sizeof(TValue);
}
struct MasterAnimationCollectionPacket : Packet
{
        int cAnimations;
        HMIL_RESOURCE handleArray;
                        //for (nAnimation = 0; nAnimation <
m_cAnimations; nAnimation++)
                        //{
                        //  pEncoder-
>AddResource(m_rghAnimations[nAnimation]);
                        //}
}
struct MasterAnimationPacket : Packet
{
        int animtype = MilAnimationCopy;
        HMIL_RESOURCE hTimeline;
        //m_animationData.WriteData(pEncoder);
}
//TMilMasterValue<TValue, ResType>::SendUpdatePacket(
struct MasterValueUpdatePacket | Packet
{
        int valueType = MilValueMarshal;
        int auxType = MilValueMarshalAux;
        int size; // sizeof(TValue)
        // resrve memory for value copy.
}
struct TMilAnimationDataPacket : Packet
{
        int animationType;
        int interpolationMethod;
        BYTE fIsAdditive;
        BYTE fIsAccumulating;
        UINT cValues;
        // next space values and key times.
        // pEncoder->AddMemory(m_rgValues, sizeof(TValue) * m_cValues);
        // pEncoder->AddMemory(m_rgKeyTimes, sizeof(double) * m_cValues);
        BYTE fHasKeySplinePoints;
        // Next: space for spline points.
        //if (m_rgKeySplinePoints)
        //{
        //      pEncoder->AddByte((BYTE)TRUE);
        //      pEncoder->AddMemory(
```

-continued

```
//                m_rgKeySplinePoints,
//                sizeof(MIL_2DPOINTD) * 2 * (m_cValues − 1));
//}
//else
//{
//        pEncoder−>AddByte((BYTE)FALSE);
//}
}
struct BitmapUpdatePixelsPacket : Packet
{
    int bitmaptype = MilBitmapUpdatePixels;
    int prectX;
    int prectY;
    int prectWidth;
    int prectHeight;
    UINT stride;
    UINT cbSize;
    // pixels after this
}
    struct BitmapAddDirtyRectPacket : Packet
{
    UINT bitmaptype = MilBitmapAddDirtyRect));
    UINT prectX;
    UINT prectY;
    UINT prectWidth;
    UINT prectHeight;
}
struct BitmapMarshalPixelsPacket : Packet
{
    UINT bitmaptype = MilBitmapCopy;
    int prectX;
    int prectY;
    int prectWidth;
    int prectHeight;
    UINT stride;
    UINT format;
    UINT cbSize;
    // pixels after this
}
struct RenderDataMarshalPacket : Packet
{
    int renderdatatype = MilRenderDataCopy;
    UINT nHandleCount;
    UINT nByteCount;
    // handles and data follow.
}
//CMasterCompositionContext::SetRoot
struct CompositionContextSetRootPacket : Packet
{
    UINT commandType = CONTEXT_SETROOT;
    HMIL_COMPNODE hRoot;
}
//CMasterCompositionNode::SetProperty
struct CompositionNodeSetPropertyPacket : Packet
{
    UINT commandType = CCompositionCommand::NODE_SETPROPERTY;
    HMIL_RESOURCE hResource;
    // command memmory here.
}
//CMasterCompositionNode::InsertChildAt
struct CompositionNodeInsertChildAtPacket : Packet
{
    UINT commandType = CCompositionCommand::NODE_INSERTCHILD;
    HMIL_COMPNODE hChild;
    UINT iPosition;
}
//CMasterCompositionNode::RemoveChild
struct CompositionNodeRemoveChildPacket : Packet
{
    UINT commandType = CCompositionCommand::NODE_REMOVECHILD;
    HMIL_COMPNODE hChild;
}
//CMasterCompositionNode::Marshal
struct CompositionNodeMarshalPacket : Packet
{
    UINT commandType = CCompositionCommand::NODE_CREATE;
    HMIL_RESOURCE hTransform;
    HMIL_RESOURCE hClip));
    HMIL_RESOURCE hRenderData;
```

-continued

```
        HMIL_RESOURCE hAlpha;
        UINT childCount;
        // handles here
}
//CMilResourceGeometry::MarshalEmpty
struct GeometryMarshalEmptyPacket : Packet
{
        UINT geomType;
}
//CMilResourceGeometry::MarshalLine
struct GeometryMarshalLinePacket : Packet
{
        int pGeomType;
        HMIL_RESOURCE hTransformRes;
        double Point1X;
        double Point1Y;
        HMIL_RESOURCE hPoint1Res;
        double Point2X;
        double Point2Y;
        HMIL_RESOURCE hPoint2Res;
}
//CMilResourceGeometry::MarshalRectangle
struct GeometryMarshalRectangle : Packet
{
        int pGeomType;
        HMIL_RESOURCE hTransformRes;
        double RectX;
        double RectY;
        double RectWidth;
        double RectHeight;
        HMIL_RESOURCE hRectRes;
        double RadiusX;
        HMIL_RESOURCE hRadiusXRes;
        double RadiusY;
        double RadiusYRes;
}
//CMilResourceGeometry::MarshalEllipse
struct GeometryMarshalEllipse : Packet
{
        int pGeomType;
        HMIL_RESOURCE hTransformRes;
        double CenterX;
        double CenterY;
        HMIL_RESOURCE hCenterRes;
        double RadiusX;
        HMIL_RESOURCE hRadiusXRes;
        double RadiusY;
        HMIL_RESOURCE hRadiusYRes;
}
//CMilResourceGeometry::MarshalPath
struct GeometryMarshalPath : Packet
{
        int pGeomType;
        HMIL_RESOURCE hTransformRes;
        int FillMode;
        int Count;
        int Size;
        // path data appended here.
        // pEncoder->AddMemory(pGeom->FigureData, pGeom->Size);
}
//HRESULT CMilResourceGeometry::MarshalCollection
struct GeometryMarshalCollectionPacket : Packet
{
        int pGeomType;
        HMIL_RESOURCE hTransformRes;
        int CombineMode;
        int count;
        // handles here:
        //for (UINT i=0; i<pGeom->Count; i++)
        //{
        //      pEncoder->AddResource(pGeom->Resources[i]);
        //}
}
//HRESULT CGlyphCacheMasterManager::UpdateResource(bool fAddBitmaps)
struct UpdateGlyphCachePacket : Packet
{
        MIL_UPDATE_GLYPHCACHE us;
        ARRAY_RECORD glyphIndeces; // UINT array of indeces. Allocated with
AddArray
```

-continued

```
        ARRAY_RECORD glyphBitmaps[ ]; // number of entries is nr of
glyphIndeces
        ARRAY_RECORD normAdvancedWidth;   // number of entries is nr of
glyphIndeces
        ARRAY_RECORD fontFileName;
}
//HRESULT CMilMasterGlyphRun::DoMarshal
struct GlyphRunMarshalPacket : Packet
{
    GLYPHRUN_MARSHAL_TYPE glyphRunType;
    MIL_CREATE_GLYPHRUN createStruct;
    USHORT GlyphIndeces[ ];
    DOUBLE AdvanceWidths[ ];
    WCHAR UnicodeString[ ];
    MIL_2DPOINTF GlyphOffsets[ ];
    USHORT CharacterToGlyphMap[ ];
    WCHAR FontFileName[ ];
}
//HRESULT CMilMasterGlyphRun::MarshalRealization
struct GlyphRunRealizationPacket | Packet
{
    GLYPHRUN_MARSHAL_TYPE glyphRunType;
    DOUBLE scaleX;
    DOUBLE scaleY;
}
//HRESULT CMilMasterGlyphRun::MarshalGeometryHandle
struct GlyphRunMarshalGeometryHandlePacket : Packet
{
    GLYPHRUN_MARSHAL_TYPE glyphRunType;
    HMIL_RESOURCE hGeometry;
}
//CMilResourcePen::SetWidth
struct PenSetWidthPacket : Packet
{
    int penCommand = CMilPenData::MilPenSetWidth;
    double width;
}
//CMilResourcePen::Marshal
struct PenMarshalPacket : Packet
{
    int penCommand = CMilPenData::MilPenCopy;
    HMIL_RESOURCE hBrushRes;
    HMIL_RESOURCE hWidthRes;
    double width;
    double miterLimit;
    BYTE startCap;
    BYTE endCap;
    BYTE dashCap;
    BYTE joinCap;
}
//CMasterHWndRenderTarget::Marshal
struct HWndRenderTargetMarshalPacket : Packet
{
    int targetCommand = CCompositionCommand::HWNDRT_CREATE;
    HWND m_hWnd;
    HMIL_CONTEXT m_hCompositionContext;
    UINT uiWidth;
    UINT uiHeight;
    UINT dwRTInitializationFlags;
}
//CMasterHWndRenderTarget::SetCompositionContext
struct HWndRenderTargetSetCompositionContextPacket : Packet
{
    int targetCommand = CCompositionCommand::HWNDRT_SETCONTEXT;
    HMIL_CONTEXT hCompositionContext;
}
//CMasterHWndRenderTarget::Resize
struct HWndRenderTargetResizePacket : Packet
{
    int targetCommand = CCompositionCommand::HWNDRT_RESIZE;
    UINT uiWidth;
    UINT uiHeight;
}
//CMasterHWndRenderTarget::Invalidate
struct HWndRenderTargetInvalidatePacket : Packet
{
    int targetCommand = CCompositionCommand::HWNDRT_INVALIDATE;
    RECT rect;
}
```

```
//CMasterHWndRenderTarget::SetRenderingMode
struct HWndRenderTargetSetRenderingModePacket
{
    int targetCommand = CCompositionCommand::HWNDRT_SETRENDERINGMODE;
    UINT dwRTInitializationFlags;
}
//CMasterGenericRenderTarget::Marshal
struct GenericRenderTargetMarshalPacket : Packet
{
    int targetCommand = CCompositionCommand::HWNDRT_CREATE;
    UINT uiWidth;
    UINT uiHeight;
    UINT dwRTInitializationFlags;
    // memory copied info here
    // pEncoder->AddMemory(& m_Info, sizeof(m_Info));
}
//CMasterGenericRenderTarget::SetCompositionContext(
struct GenericRenderTargetSetCompositionContextPacket : Packet
{
    int targetCommand = CCompositionCommand::HWNDRT_SETCONTEXT;
    HMIL_CONTEXT hCompositionContext;
}
//CMilMasterTimeline::Marshal
struct TimelineMarshalPacket : Packet
{
    int type = MilTimelineMarshal;
    BYTE fIsEnabled;
    HMIL_RESOURCE hParentTimeline;
    UINT intervalCount;
    // copy memory here.
    //pEncoder->AddMemory(&ct, sizeof(MIL_CREATE_TIMELINE));
}
//CMilMasterTimeline::SendAddIntervalPacket
struct TimelineAddIntervalPacket : Packet
{
    int type = MilTimelineAddInterval;
    // copy interval memory here
    //pEncoder->AddMemory(pti, sizeof(MIL_TIME_INTERVAL));
}
//CMilMasterTimeline::SendClearPacket
struct TimelineSendClearPacket : Packet
{
    int type = MilTimelineClear;
}
//CMilMasterTimeline::SendEnablePacket
struct TimelineSendEnablePacket : Packet
{
    int type = MilTimelineEnable;
    HMIL_RESOURCE hParentTimeLine;
}
//CMilMasterTimeline::SendDisablePacket
struct TimelineSendDisablePacket : Packet
{
    int type = MilTimelineDisable;
}
//HRESULT CMilResourceTransform::MarshalIdentity
struct TransformMarshalIdentityPacket : Packet
{
    int transType = MilTransformIdentity;
}
//HRESULT CMilResourceTransform::MarshalMatrix3x2
struct TransformMarshalMatrix3x2Packet : Packet
{
    int transType = MilTransformMatrix3x2;
    double S_11;
    double S_12;
    double S_21;
    double S_22;
    double DX;
    double DY;
}
//HRESULT CMilResourceTransform::MarshalMatrix4x4
struct TransformMarshalMatrix4x4Packet : Packet
{
    int transType = MilTransformMatrix4x4;
    float coef[16];
}
//HRESULT CMilResourceTransform::MarshalTranslate
struct TransformMarshalTranslatePacket : Packet
```

```
                                                    -continued
{
    int transType = MilTransformTranslate;
    double OffsetX;
    HMIL_RESOURCE OffsetXRes;
    double OffsetY;
    HMIL_RESOURCE OffsetYRes;
}
//HRESULT CMilResourceTransform::MarshalScale
struct TransformMarshalScalePacket : Packet
{
    int transType = MilTransformScale;
    double ScaleX;
    HMIL_RESOURCE hScaleXReS;
    double ScaleY;
    HMIL_RESOURCE hScaleYRes);
    double CenterX;
    double CenterY;
    HMIL_RESOURCE hCenterRes;
}
//HRESULT CMilResourceTransform::MarshalRotate
struct TransformMarshalRotatePacket : Packet
{
    int transType = MilTransformRotate;
    double Angle;
    HMIL_RESOURCE hAngleRes;
    double CenterX;
    double CenterY;
    HMIL_RESOURCE hCenterRes;
}
//HRESULT CMilResourceTransform::MarshalSkew
struct TransformMarshalSkewPacket : Packet
{
    int transType = MilTransformSkew;
    double AngleX;
    HMIL_RESOURCE hAngleXRes;
    doble AngleY;
    HMIL_RESOURCE hAngleYRes;
    double CenterX;
    double CenterY;
    HMIL_RESOURCE hCenterRes;
}
struct TransformMarshalCollection : Packet
{
    int transType = MilTransformCollection;
    int Count;
    // reserve memory for collection handles
    //for (UINT i=0; i<pTrans->Count; i++)
    //{
    //      pEncoder->AddResource(pTrans->Resources[i]);
    //}
}
```

An example of the instructions to perform steps 300 to 314 is below. In the example, the composition module and render targets are created. A batch open control packet is then sent. The commands to create a composition node, a render data resource, and composition context are sent. The root node is set on the composition context, and the composition context is set on the hwnd target. At this point, the composition node, composition context, render data resource, root node, and hwnd target are associated. Resources are then created. The resources are a geometry resource, a solid brush resource, and a pen resource. Update packets are then sent to update the pen, add an ellipse to the geometry resource, and draw the geometry. A filled rectangle is then drawn and the render data is set on the composition node and the composition node is updated. To delete the composition, resource release commands are sent to release the resources and the composition device is destroyed.

```
main( )
{
    MilCompositionDevice_Create(&g_hCompositionDevice);
    // Creates the device -> generates a connect packet.
    // handled by composition proxy that creates a client composition
device for this connection.
    MilResource_HWndRenderTarget_Create(&g_hRenderTarget);
    // create a render target -> generates a resource command to create
the rendertarget resource.
```

-continued

```
    MilCompositionDevice_CreateBatch(&hBatch);
    // Opens a batch -> generates a batch open control packet
    //               handled by client composition device.
    MilResource_CompositionNode_Create(&g_hRootNode);
    // create a composition node -> generates a resource command packet
to create a composition node.
    MilResource_RenderData_Create(&g_hRenderData);
    // create a render data resource -> generates a resource command
packet to create a render data.
    MilResource_CompositionContext_Create(&g_hCompositionContext);
    // create a composition context command -> generates a resource
command packet to create a composition context.
    MilCompositionContext_SetRootNode(g_hCompositionContext,
                            g_hRootNode,
                            hBatch);
    // set the root node on the composition context -> generates a
resource command to set the root node on the context
    //         packet is handled by composition context resource
    MilResource_HWndRenderTarget_SetCompositionContext(g_hRenderTarget,
g_hCompositionContext,
                                    hBatch) );
    // set the composition context on the hwnd target -> generates a
resource command packet to set the comp context on hwnd target
    // packet is handled by the hwnd target resource.
    MilResource_Geometry_Create(&hGeometry);
    // create a geometry resource -> generates a resource command packet
that creates a geometry resource.
    MilResource_SolidBrush_Create(&hSolidBrush);
    // create a solid brush resource -> generates no packet.
    MilResource_SolidBrush_Update(hSolidBrush,
                    1.0,
                    NULL,
                    &color,
                    g_hColor,
                    hBatch);
    // set the color on the solid -> generates a resource command packet
that creates a brush resource with the given color.
    MilResource_Pen_Create(&g_hPen);
    // create a pen resource -> generates a resource command packet that
creates the pen resource.
    MilResource_Pen_Update(g_hPen,
        hSolidBrush,
        5,
        g_hPenWidth,
        MilPenCapFlat,
        MilPenCapFlat,
        MilPenCapFlat,
        MilPenJoinMiter,
        10,
        0,
        NULL,
        0.0,
        NULL,
        hBatch
        );
    // update the pen -> generates a pen update packet
    //                  handled by the pen resource
    MilGeometry_UpdateEllipse(hGeometry,
        NULL,
        100.0,
        NULL,
        50.0,
        NULL,
        100.0,
        100.0,
        NULL,
        hBatch);
    // update the geometry to contain an ellipse -> generates a geometry
update packet
    //                          handled by the
geometry resource
    MilRenderData_DrawGeometry(g_hRenderData,
        hSolidBrush,
        g_hPen,
        hGeometry
        );
    // draw the geometry to the render data -> generates a render data
update packet to draw the geometry
    //                          handled by the render
```

```
data resource
    MilRenderData_FillRectangle_InlineSolidBrush(g_hRenderData,
        200,
        200,
        300,
        300,
        colory
        );
    // draw a filled rectangle using a specified brush to the render
data -> generates a render data update packet
    //
handled by the render data resource
    MilCompositionNode_SetRenderData(g_hRootNode, g_hRenderData,
hBatch);
    // sets the render data on a composition node -> generates a
composition node update packet
    //                                          handled by the comp
node resource
    MilBatch_Commit(hBatch);
    // generates a bath close/commit packet.
    //                  handled by client composition device.
    // this is the notification processing loop
    do
    {
        WaitOnEvents( );
        MilCompositionDevice_ProcessNotifications(g_hCompositionDevice);
        // here we internally process notification packets coming from
the client composition device.
    } while( composition still running: controlled by layer using the
compositor);
    // all the resource release calls generate resource destroy packets
and queue flush control packets .
    //                  handled by client composition device.
    MilResource_Release(g_hCompositionContext);
    MilResource_Release(g_hRootNode);
    MilResource_Release(g_hHandleTable, g_hRenderData);
    MilResource_Release(g_hPen);
    MilResource_Release(g_hColor);
    MilResource_Release(g_hPenWidth);
    MilResource_Release(g_hITarget);
    MilCompositionDevice_Destroy(g_hCompositionDevice);
    // on exiting the loop we shut down
}
LONG_PTR lMainWindowProc(
    HWND        hwnd,
    UINT        message,
    WPARAM      wParam,
    LPARAM      lParam
    )
{
    HRESULT hr = S_OK;
    HMIL_BATCH hBatch = NULL;
    switch (message)
    {
    case WM_ERASEBKGND:
        return 0;
    case WM_SIZE:
        if  (g_hHandleTable &&
            g_hRenderTarget &&
            g_hCompositionDevice)
        {
            MilCompositionDevice_CreateBatch(
                g_hCompositionDevice,
                &hBatch);
            // sends an open batch packet.
            //                  handled by client composition device.
            MilResource_HWndRenderTarget_Resize(g_hRenderTarget,
                                        LOWORD(lParam),
                                        HIWORD(lParam),
                                        hBatch);
            // resize render target -> sends a render target resize
resource command
            //                          handled by render target resource
            MilBatch_Commit(hBatch);
            // send close/commit batch control packet
            //          handled by client composition device.
        }
        break;
    case WM_PAINT:
```

-continued

```
{
    PAINTSTRUCT ps;
    BeginPaint(hwnd, &ps);
    if ((ps.rcPaint.left < ps.rcPaint.right) &&
        (ps.rcPaint.top < ps.rcPaint.bottom) &&
        g_hCompositionDevice)
    {
        MilCompositionDevice_CreateBatch(
                g_hCompositionDevice,
                &hBatch));
        // sends an open batch packet.
        //              handled by client composition device.
        MilBatch_Commit(hBatch);
        // send close/commit batch control packet
        //              handled by client composition device.
    }
    EndPaint(hwnd, &ps);
}
break;
case WM_DESTROY:
    if (g_hCompositionDevice)
    {
        MilCompositionDevice_CreateBatch(
                g_hCompositionDevice,
                &hBatch;
        // sends an open batch packet.
        MilResource_Release(
                g_hHandleTable,
                g_hRenderTarget);
        // send a resource delete control packet
        //              handled by client composition device.
        MilCompositionDevice_FlushChangeQueue(
                g_hCompositionDevice);
        // send a queue flush control packet.
        //              handled by client composition device.
        MilBatch_Commit(hBatch);
        // send close/commit batch control packet
        //              handled by client composition device.
    }
    PostQuitMessage(0);
```

We claim:

1. A computer-readable storage medium having a set of instructions which when executed performs a method to render a composition on a device, the method executed by the set of instructions comprising:

creating a composition node in response to receiving a create composition node packet;

creating at least one resource for rendering the composition in response to receiving at least one create resources packet, wherein creating the at least one resource for rendering the composition comprises:

receiving a series of time stamped values associated with intervals over which the at least one resource is to be animated, normalizing the received series of time stamped values to a global timeline, evaluating each interval to derive an instantaneous value for the at least one resource, wherein creating the at least one resource for rendering the composition based at least in part on the received series of time stamped values comprises creating the at least one resource for rendering the composition based at least in part of the received series of time stamped values associated with a representation of endpoints of a timeline during which the intervals remain active; and creating the composition in response to receiving at least one render update packet.

2. The computer-readable storage medium of claim 1 further comprising creating a render data resource in response to receiving a create render data resource packet.

3. The computer-readable storage medium of claim 1 further comprising opening a batch process in response to receiving a batch open packet.

4. The computer-readable storage medium of claim 3 further comprising processing one of the at least one create resources packet and at least one resource update packet in response to receiving a close/commit batch packet.

5. The computer-readable storage medium of claim 1 further comprising releasing a resource in response to receiving a release command.

6. The computer-readable storage medium of claim 1 further comprising sending a notification in response to receiving a command packet.

7. A method to render a composition on a device, the method comprising:

creating a composition node in response to receiving a create composition node packet;

creating at least one resource for rendering the composition in response to receiving at least one create resources packet, wherein creating the at least one resource for rendering the composition comprises:

receiving a series of time stamped values associated with intervals over which the at least one resource is to be animated, normalizing the received series of time stamped values to a global timeline, evaluating each interval to derive an instantaneous value for the at least one resource, wherein creating the at least one resource for rendering the composition based at least in part on the received series of time stamped values comprises creating the at least one resource for rendering the composition based at least in part of the received series of time stamped values associated with a representation of endpoints of a timeline during which the intervals remain active; and creating the composition in response to receiving at least one render update packet.

8. The method of claim 7 further comprising creating a render data resource in response to receiving a create render data resource packet.

9. The method of claim 7 further comprising opening a batch process in response to receiving a batch open packet.

10. The method of claim 9 further comprising processing one of the at least one create resources packet and at least one resource update packet in response to receiving a close/commit batch packet.

11. The method of claim 7 further comprising releasing a resource in response to receiving a release command.

12. The method of claim 7 further comprising sending a notification in response to receiving a command packet.

13. A system to render a composition on a device, the system comprising:

a memory storage; and a processing unit coupled to the memory storage, wherein the processing unit is operative to:

create a composition node in response to receiving a create composition node packet;

create at least one resource for rendering the composition in response to receiving at least one create resources packet, wherein the processing unit being operative to create the at least one resource for rendering the composition comprises the processing unit being operative to;

receive a series of time stamped values associated with intervals over which the at least one resource is to be animated, normalize the received series of time stamped values to a global timeline, evaluate each interval to derive an instantaneous value for the at least one resource, wherein the processing unit being operative to create the at least one resource for rendering the composition based at least in part on the received series of time stamped values comprises the processing unit being operative to create the at least one resource for rendering the composition based at least in part of the received series of time stamped values associated with a representation of endpoints of a timeline during which the intervals remain active; and create the composition in response to receiving at least one render update packet.

14. The system of claim 13 further comprising the processing unit being operative to create a render data resource in response to receiving a create render data resource packet.

15. The system of claim 14 further comprising the processing unit being operative to open a batch process in response to receiving a batch open packet.

16. The system of claim 15 further comprising the processing unit being operative to process one of the at least one create resources packet and at least one resource update packet in response to receiving a close/commit batch packet.

17. The system of claim 13 further comprising the processing unit being operative to release a resource in response to receiving a release command.

18. The system of claim 13 further comprising the processing unit being operative to send a notification in response to receiving a command packet.

* * * * *